United States Patent [19]
Hendry

[11] 3,985,486
[45] Oct. 12, 1976

[54] ADJUSTABLE MANIFOLD AND NOZZLE ASSEMBLY FOR FOAM MOLDING MACHINES
[75] Inventor: James W. Hendry, Holland, Mich.
[73] Assignee: Ex-Cell-O Corporation, Troy, Mich.
[22] Filed: Dec. 20, 1974
[21] Appl. No.: 534,540

[52] U.S. Cl. .......................... 425/248; 425/451.9; 425/817 R
[51] Int. Cl.² ............................................ B29F 1/03
[58] Field of Search ............ 425/190, 247, 248, 4 R, 425/817 R, 244, 245, 451.9, 242 R, 191, 242 B, 192, DIG. 227; 264/328, 329; 141/236, 279, 284, 387

[56] References Cited
UNITED STATES PATENTS

| | | | |
|---|---|---|---|
| 2,162,563 | 6/1939 | Oldham | 425/248 X |
| 3,251,386 | 5/1966 | Bellato | 141/279 |
| 3,512,216 | 5/1970 | Voelker | 425/247 X |
| 3,687,582 | 8/1972 | Hendry | 425/4 R |
| 3,718,166 | 2/1973 | Gordon | 425/247 X |

FOREIGN PATENTS OR APPLICATIONS

| | | | |
|---|---|---|---|
| 1,380,690 | 10/1963 | France | 425/246 |

Primary Examiner—Francis S. Husar
Assistant Examiner—Mark Rosenbaum
Attorney, Agent, or Firm—James H. Bower; Frank D. Risko

[57] ABSTRACT

The nozzle manifold assembly of an injection molding machine is infinitely adjustable horizontally perpendicular to the nozzle axis. The nozzles themselves project through slots in the front clamp plate of the machine which give flexibility to the mold designer in his placement of sprues and runners for filling the mold. Additionally this manifold assembly and its associated injection hardware, such as the shot accumulator, hydraulic pressure accumulator and valving, are mounted on a carriage assembly which is capable of moving horizontally in a direction parallel to the axis of the nozzles thereby allowing the nozzles and associated heater bands to be accessed and maintained without the need for removing the mold from the machine.

9 Claims, 5 Drawing Figures

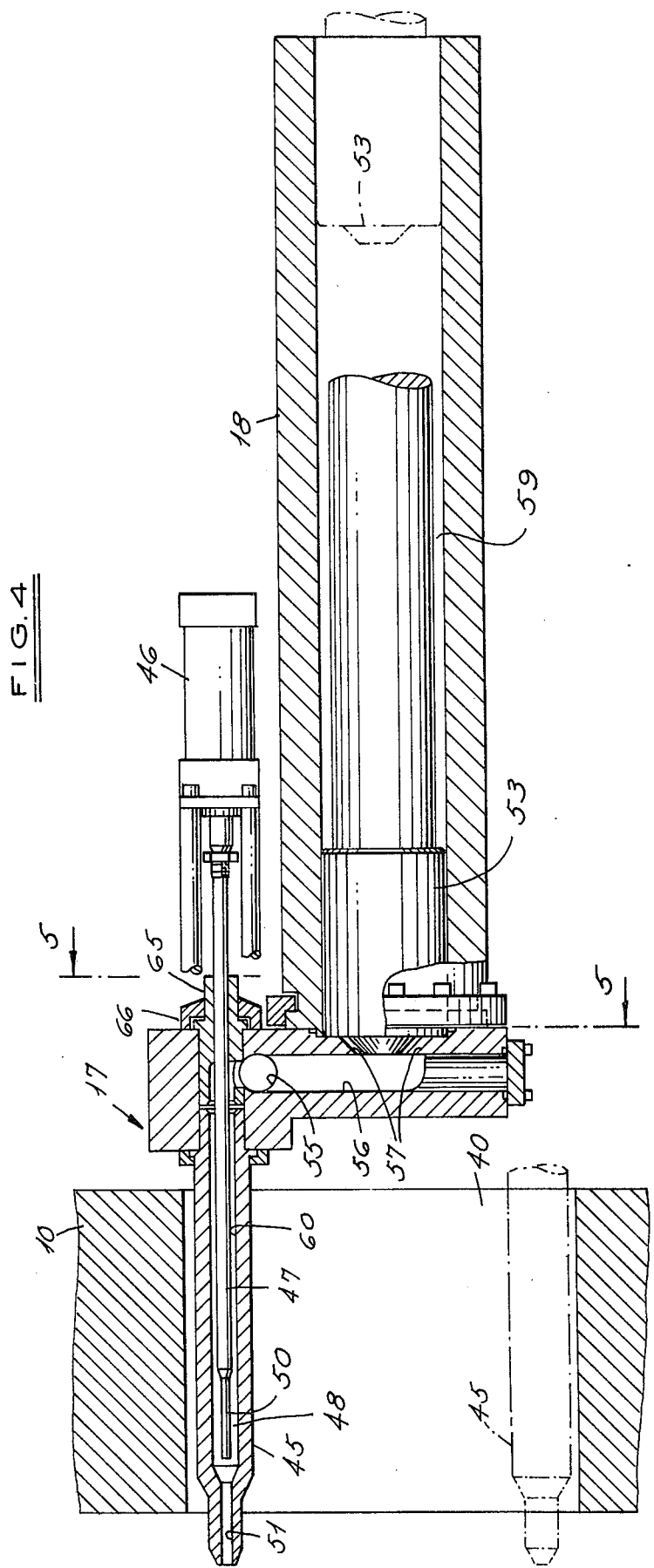

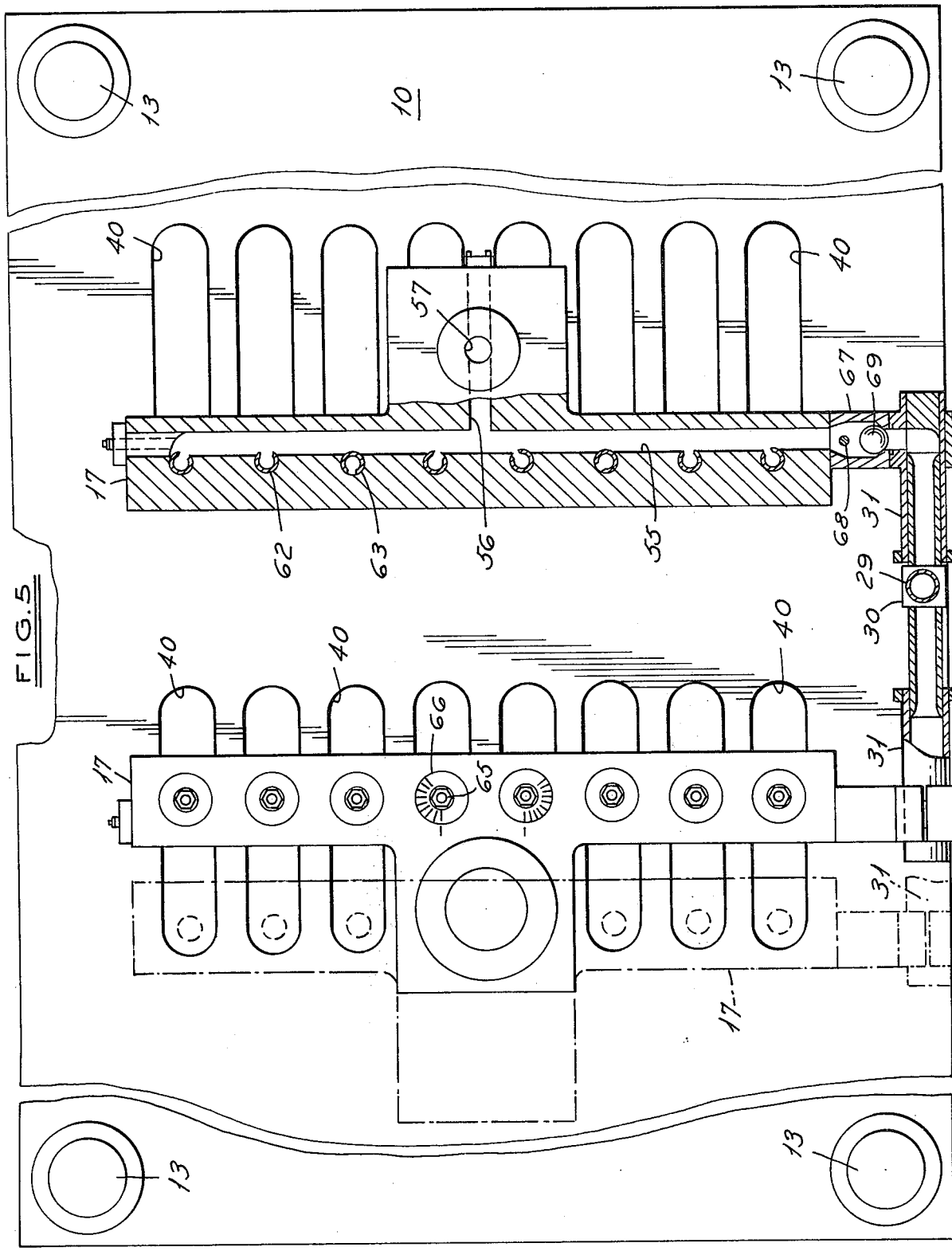

3,985,486

ADJUSTABLE MANIFOLD AND NOZZLE ASSEMBLY FOR FOAM MOLDING MACHINES

BACKGROUND OF THE INVENTION

1. Field of the Invention

This invention relates to a plastic molding method and apparatus and specifically relates to the adjustability of multiple manifolds holding a plurality of plastic injection nozzles for a molding machine.

2. Description of Prior Art

Three major areas of the prior art require discussion in order to understand the need for this invention. Most injection molding machines, and specifically those involved in the injection of foam plastic, are very restricted as to the placement of nozzles which feed plasticized material into the mold cavity. This basic restriction is a carry-over from the injection molding processes and many attempts have been made in the art to reduce this restriction. A specific method is U.S. Pat. No. 3,718,166 which allows a limited universal movement of the nozzle end to accommodate the mold. This method, however, still places a restriction on the mold designer as to the placement of nozzles for injection of plastized material. This restriction, which is accepted industry practice, places the center of the nozzle axis starting from the centerline of the platen on a 6 inch grid spacing in both directions.

In an injection molding process, the material can be forced into all the areas of the mold cavity by high pressure ranging from 2,000 psi to cover 10,000 psi. Hence, the tonnage of the machine and its clamp pressure are directly proportional to the size of the part to be molded. However, in using a foaming plastic, large clamping forces are not needed because a foaming agent or an inert gas, such as nitrogen, is introduced into the plastic material; and, after it is released into the mold cavity, the gas at low pressure ranging from 50 psi to 500 psi in the melt will force the plastic into all the corners and sections of the mold. However, as the gas is expanding in the mold cavity, the plastic material is setting up and beginning to solidify. This means it is not practical, if size is a consideration, to have just one nozzle entering the mold cavity. Therefore, in almost all applications, fixed multiple nozzles such as shown in U.S. Pat. No. 3,718,166 are used in the injection molding of plastic parts and is extended to the injection molding of foam plastic to get the foaming agent and plastic material to all parts of the mold as quickly as possible. This resolved the problem of expanding plastic and distribution but the mold designer was still very restricted on the exact placement of gating into the mold due to fixed nozzle positions. To circumvent this problem, special fixed plates in the mold or machines were made to accommodate the sprue and gate openings in the mold.

The third major item is replacement of heater bands or general maintenance on the nozzles. A typical problem with a structural foam injection molding machine is the breakdown of heater bands on the nozzle. These heater bands must be replaced because, with a nozzle plugged, the distribution of the plastic material will not be uniform in the part being molded. The replacement of the heater bands usually necessitates removing the mold from the fixed clamp plate, a very time consuming job, and stepping inside the machine to make any repair.

SUMMARY OF THE INVENTION

This invention ingeniously solves the many problems stated above and gives the mold designer a greater flexibility in his gating designs and sprue openings. The nozzles and feeder manifolds are mounted so that they can be infinitely adjustable in a horizontal plane within slots machined in the front clamp plate of the machine. The slots are symmetrical about the center line of the vertical plate extending a distance in excess of the nominal 6 inch grid spacing and the nozzles and manifold on each side can be moved independently. Also, in this invention, manifold assmblies, including all the nozzles, can be retracted out of the slots in the stationary platen of the molding machine to a position on the frame whereby the nozzles and their respective heater bands can be easily inspected and any required maintenance can be performed. This procedure does not disturb the mold cavity in the machine and therefore reduces maintenance time and the costly downtime of the machine. Replacement of the nozzles and the adjustment of any of its parts is also facilitated.

A BRIEF DESCRIPTION OF THE DRAWINGS

FIG. 4 is an enlarged view along line 4—4 in FIG. 2 showing the details of the manifold and nozzle assembly in the slot in the front plate.

FIG. 5 is a view along line 5—5 in FIG. 4 showing the left-hand nozzles in a given position and a sectional view of the right-hand manifold showing flow control valving to the nozzle.

DESCRIPTION OF THE INVENTION

This invention is the adjustability of the manifold and nozzle assembly in a structural foam injection molding machine in a plane horizontal and perpendicular to the axis of the nozzle. It also allows this manifold and nozzle assembly to be removed completely from the mold cavity and front clamp plate to allow for adjustment, replacement, or repair of the nozzle heater bands without disassembling the machine or removing the mold halves from the machine.

Figure 1:
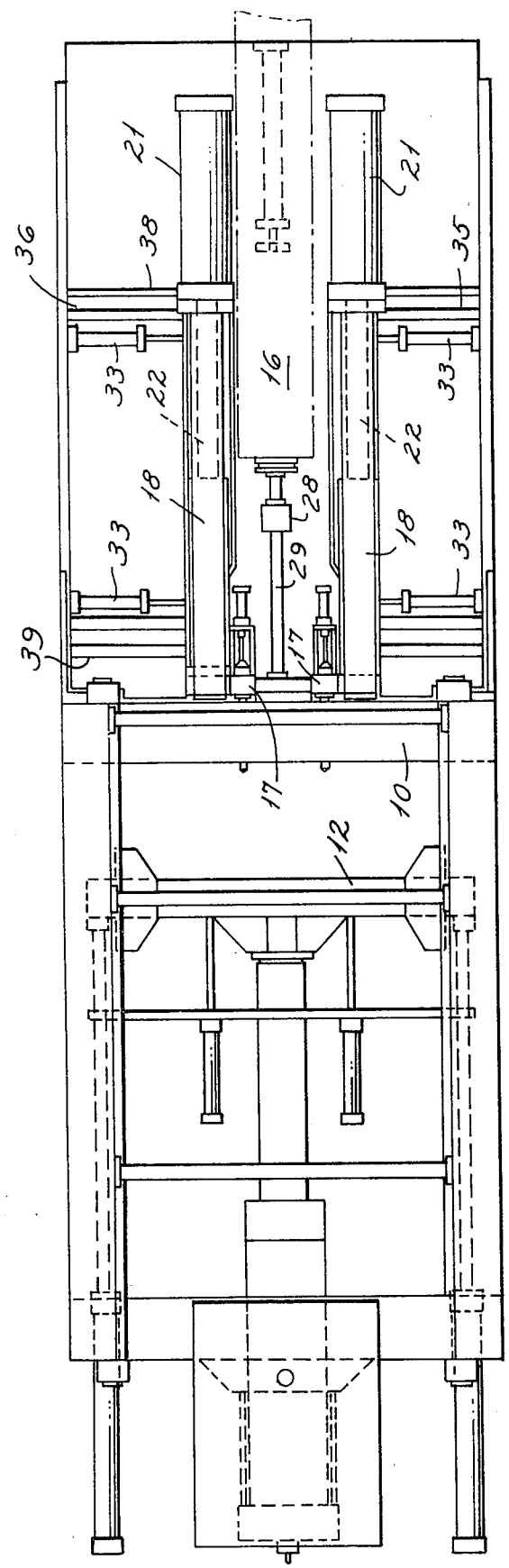
FIG. 1 is a plan view of a structural foam injection molding machine incorporating the invention.
Figure 2:
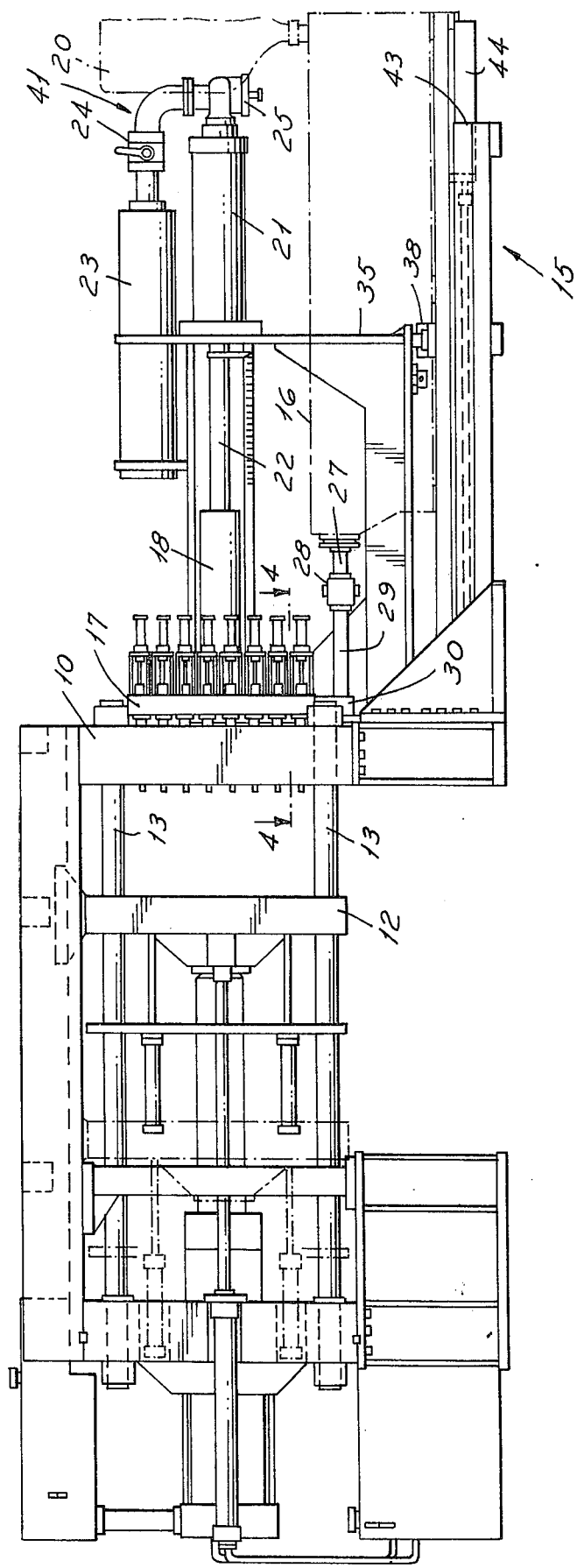
FIG. 2 is a side elevation of a structural foam injection molding machine incorporating the invention and showing the manifold and nozzle assembly in molding position.

FIG. 1 and FIG. 2 give the overall view of an injection molding machine and will be used to show the general nature of its operation. The invention is disclosed in these figures but will be more definitized in subsequent figures. An overview of the machine in FIG. 1 and FIG. 2 shows the front plate 10 as forming one-half of the clamp and being supported on riser 11. The other half of the clamp consists of the traveling plate 12 which is capable of sliding on tie-bars 13. The bed 15 supports the extruder 16 and the superstructure for the manifold nozzle assembly 17, the plastic accumulators 18 and the miscellaneous hydraulic piping and components. The hopper 20 is mounted on the rear of the extruder for storing pelletized plastic material. Each plastic accumulator 18 has its own hydraulic actuator/intensifier 21 connected to the plastic accumulators 18 by rod end 22. Hydraulic accumulator 23 stores fluid under pressure which is used to supply high fluid pressure to the actuator/intensifier 21 during the injection cycle. Shut-off valve 24 and control valve 25 are located between the accumulator 23 and the actuator 21.

A relief valve 28 shown at the outlet of extruder 16 vents excessive pressures which may build up during the extruding process. Pipe 29 connects this to the manifold assemblies 17 via a tee-joint 30 which connects through a sliding joint 31. The hydraulic accumulator 23, shot actuator 21, plastic accumulator 18 and manifold assembly 17 are mounted on carriage assembly 35 and 36. Each assembly is mounted on cross rails 38 and 39 which allow the nozzle carriage assembly 35 or 36 to move by action of the hydraulic actuator 33. This movement of the nozzle carriage assembly 35 and 36 and, in turn, the movement of the manifold assemblies 17 allows an infinite lateral or horizontal adjustment of the nozzles. Slots 40 shown best in FIG. 4 and FIG. 5 show the distance variation in excess of the nominal 6 inch grid spacing which the nozzle assembly 17 can move, as shown in phantom in FIG. 4. It should be noted that although hydraulic actuators are used in this embodiment that other means may be used to move the carriage assemblies. For example, a worm and screw means, a cam means whereby rotation of the cam caused the carriage assembly to move horizontally, a rack and pinion means where the rack is attached to the carriage and the pinion rotated (the reverse of this could also be satisfactory) or a chain and sprocket means. All these means could accomplish the desired movement.

Figure 3:
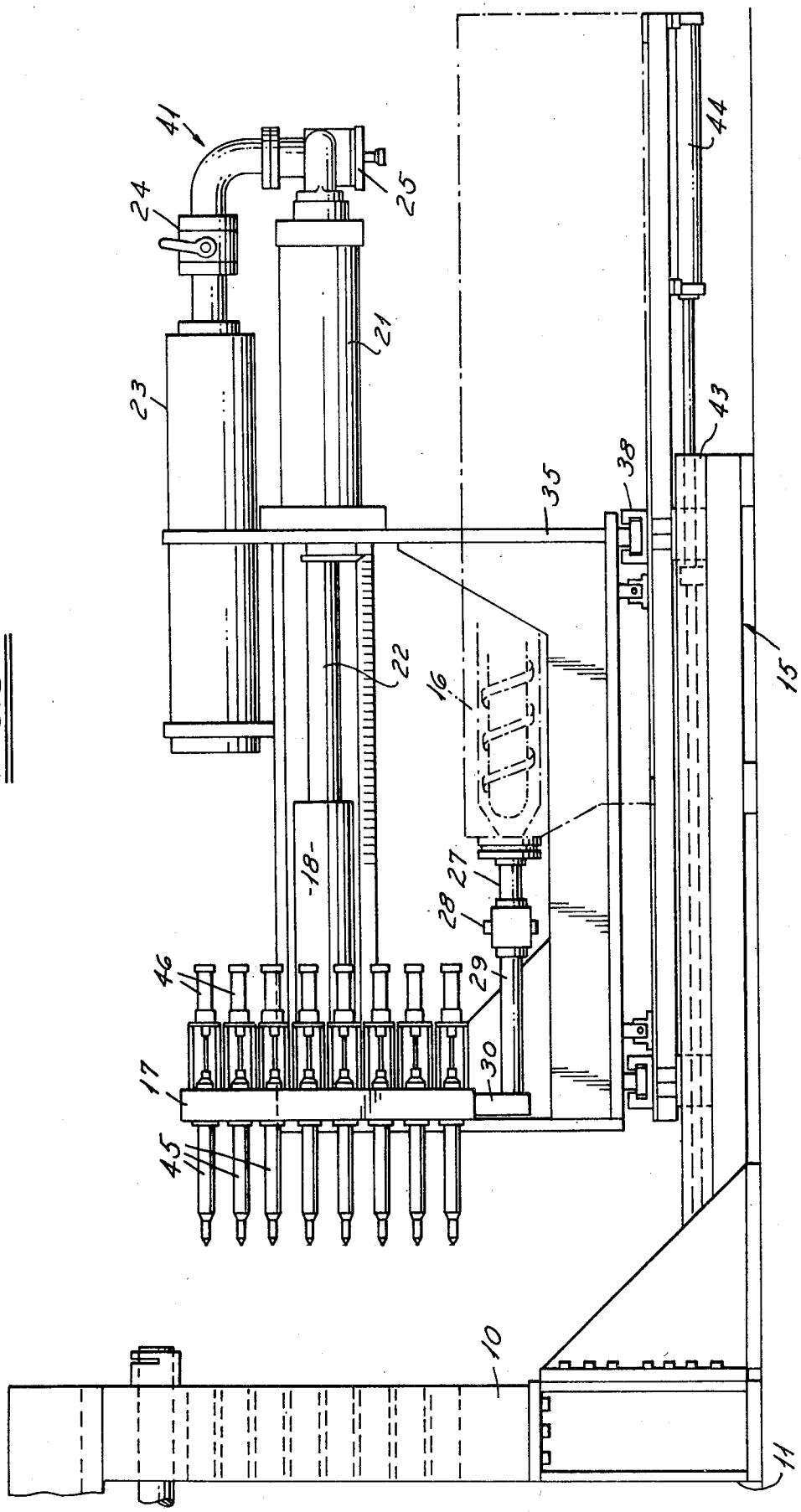
FIG. 3 is a side elevation of the extruder fixed plate end of a structural foam injection molding machine showing the manifold and nozzle assembly retracted from the fixed plate.

FIG. 3 shows the entire extruder carriage assembly 41 retracted from the front plate 10 of the machine being slidably removed on carriage rails 43 by hydraulic piston assembly 44. Here again, other means can accomplish this movement. Manifold assembly 17 can best be seen with its plurality of nozzles 45 and individual nozzle shut-off cylinder 46 with its rod end, or plunger 47, in FIG. 4. Actuation of cylinder 46 moves rod end 47 forward with its diameter 50 engaging bore 51 in nozzle 45 to shut off flow of plasticized material. When the shot accumulator is filled with plasticized material, the rod end 53 will be moved back to the position shown in phantom in FIG. 4 and chamber 59 will be filled. The shot chamber 59 is connected to bore 56 through orifice 57 to bore 55 and into nozzle hole 60 to reduced diameter bore 51. Nozzles 45 are adjustable as can be seen in FIG. 5 by nozzle 62, and nozzle 63, which shows a full ON position in the former and a full OFF position in the latter. This metering is controlled by metering units 65 which rotate to limit flow of material. The calibrated plate 66 also moves to show the amount of metering. Check valve 67 is inserted between the manifold assembly 17 and the material flow path to prevent plasticized material flowing back into the extruder during a shot cycle. FIG. 5 also shows two different positions of the nozzles in the slots 40.

OPERATION OF THE INVENTION

Referring now to FIG. 2 and FIG. 3, pellet material from the hopper 20 enters extruder 16 and is heated and plasticized. The material now flows from the extruder 16 through pipe 27, through check valve 28, pipe 29 and Tee-fitting 30. At the beginning of a cycle (see FIG. 4) the rod end 53 of the shot accumulator is in the forwardmost position as shown; the nozzle shut-off cylinder 46 is energized with the rod end 47 and diameter 50 enjoining bore 51 sealing off the nozzle 45. The material flows now through the sliding joint 31 through check valve 67 which is now open with the ball 69 stopped against pin 68. This prevents ball 69 from plugging bore 55. The material flows up bore 55 to cross bore 56, through orifice 57 and starts to fill chamber 59 of shot accumulator by pushing rod end 53 rearward to the position shown in phantom. During this time, the nozzle chambers 48 and the manifold are filled with plasticized material and the hydraulic accumulator 23 is being charged with fluid under high pressure. When the correct amount of material has filled the shot accumulator, the nozzle shut-off cylinders 46 are de-energized and retracted and the control valve 25 now releases the fluid pressure to the shot actuator 21 (FIG. 2) which now pushes the material in the shot accumulator chamber 59 into the nozzle manifold 17. When this occurs, check valve 67 closes and the material is forced out orifice 57 through pipe 56 into bore 55 to the various nozzles. Upon completion of the injection stroke of the shot accumulator 18, the nozzle shut-off cylinders 46 are energized and the nozzles are shut off by the rod ends 47. This process would have filled a mold cavity placed in the machine between the front plate 10 and the traveling plate 12. After sufficient cooling time, the die or mold is opened and the part ejected by conventional means. The parts would normally drop down to a conveyor system under the machine to remove these parts and the cycle is started again after the mold is closed.

Not shown but well shown in the art is the use of hydraulic fluid power from a power supply to supply all the necessary hydraulic fluid and the cooling means for both reservoir and molds. Also not shown are heater bands which are a necessary part of the extruder and nozzles to keep the plasticized material up to temperature so that it can be properly injected. The molds themselves would contain cooling passages and in some cases calrods for heating in order to keep the material heated during the injection cycle and to have the ability to cool the mold so that the part can be removed quicker.

When it is now necessary to change molds, the carriage assembly 41 would be retracted, as shown in FIG. 3, the old molds removed, new molds installed, the nozzles lined up, flow requirement adjusted (as shown in FIG. 5) and the carriage assembly moved to its injection position. If maintenance is required on the nozzle, the nozzle or heater band could be changed, modified or adjusted. The vertical positioning of these nozzles may also be effected thereby giving the same ultimate result.

I claim:
1. In an injection molding machine having a clamp section consisting of a fixed front plate and a moving plate with mold sections affixedly held and clamped therebetween, one of said mold sections containing sprue openings, wherein said sprue openings have arbitrary locations, and an extruder means upstream of said sprue openings for plasticizing resin wherein the improvement comprises:
 a plurality of slot means through said front plate wherein said sprue openings in one of said mold sections correspond with said slot means;
 a nozzle means disposed in said slot means; said slot means being configured as an oblong form having a width dimensionally larger than diameter of said nozzle with said oblong dimension at least twice the diameter of said nozzle;

the axis of said nozzle means being disposed through said slot means, said nozzle means affixed to a manifold means, wherein said manifold means is fixedly attached to a carriage means;

said carriage means adjustably affixed to machine base means; and said carriage means adjustable perpendicular to said nozzle axis wherein said nozzle means can be moved within said slot means simultaneously to align with said sprue openings.

2. The apparatus of claim 1 wherein said carriage means has co-axial tubes connecting said manifold means to said extruder means.

3. The apparatus of claim 1 wherein said nozzle means is adjustable by moving said carriage means from a first operational position wherein said nozzles are disposed in said slots engaging said sprue openings and the injection of plasticized resin into said mold sections occurs during the cycle of said apparatus to a second non-operational position wherein no injection of plasticized resin into said mold section can occur and said nozzles are retracted from said slots.

4. The apparatus of claim 1 wherein the carriage means is adjustable by a hydraulic cylinder means.

5. In an injection molding machine having a clamp section consisting of a fixed front plate and a moving plate with mold sections affixedly held and clamped therebetween, one of said mold sections containing a sprue opening wherein said sprue opening has an arbitrary location, and an extruder means upstream of said sprue opening for plasticizing resin wherein the improvement comprises:

said front plate with a slot means disposed therethrough wherein said sprue opening corresponds with said slot means;

a nozzle means disposed in said slot means; said slot means being configured as an oblong form having a width dimensionally larger than diameter of said nozzle with said oblong dimension at least twice the diameter of said nozzle;

the axis of said nozzle means disposed through said slot means and said nozzle means affixed to a manifold means, wherein said manifold means is fixedly attached to a carriage means;

said carriage means adjustable perpendicular to said nozzle axis wherein said nozzle means within said slot means is aligned with said sprue opening.

6. The apparatus of claim 5 wherein said nozzle means is adjustable by moving said carriage means from a first operational position wherein said nozzle is disposed in said slot engaging said sprue opening and the injection of plasticized resin into said mold sections occurs during the cycle of said apparatus to a second non-operational position wherein no injection of plasticized resin into said mold section can occur and said nozzle is retracted from said slot.

7. The apparatus of claim 3 wherein said carriage means has co-axial tubes connecting said manifold means to said extruder means.

8. The apparatus of claim 5 wherein said carriage means has co-axial tubes connecting said manifold means to said extruder means.

9. The apparatus of claim 6 wherein said carriage means has co-axial tubes connecting said manifold means to said extruder means.

* * * * *